Figure 1:
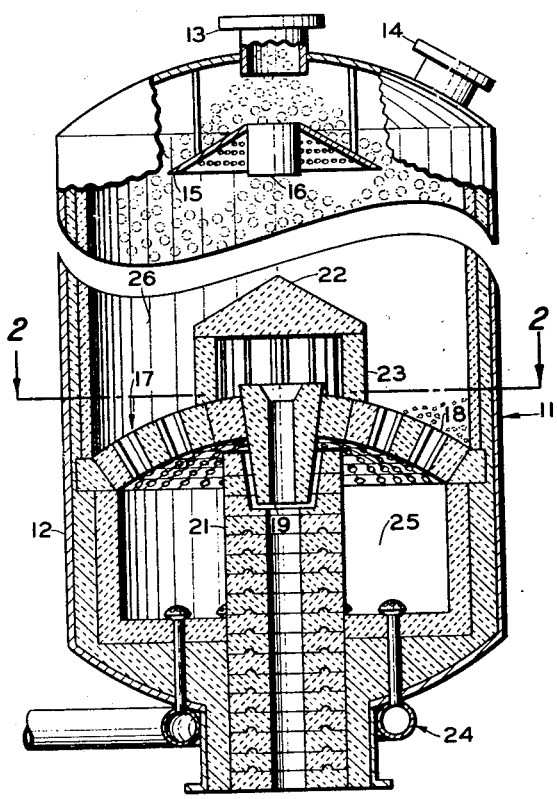

Aug. 28, 1951 R. R. GOINS 2,565,809
PEBBLE HEATING CHAMBER
Filed Aug. 9, 1948 3 Sheets-Sheet 1

INVENTOR.
R. R. GOINS
BY
ATTORNEYS

Aug. 28, 1951  R. R. GOINS  2,565,809
PEBBLE HEATING CHAMBER
Filed Aug. 9, 1948  3 Sheets-Sheet 2

INVENTOR.
R. R. GOINS
BY
ATTORNEYS

Aug. 28, 1951  R. R. GOINS  2,565,809
PEBBLE HEATING CHAMBER
Filed Aug. 9, 1948  3 Sheets-Sheet 3

INVENTOR.
R. R. GOINS
BY Hudson and Young
ATTORNEYS

Patented Aug. 28, 1951

2,565,809

UNITED STATES PATENT OFFICE 2,565,809

PEBBLE HEATING CHAMBER

Robert R. Goins, Bartlesville, Okla., assignor to Phillips Petroleum Company, a corporation of Delaware Application August 9, 1948, Serial No. 43,243

10 Claims. (Cl. 263—19)

This invention relates to pebble heater apparatus. In one of its more specific aspects, it relates to improved pebble heater and reaction chambers of pebble heater apparatus. In another of its more specific aspects, it relates to a method of regulating pebble flow through pebble heater apparatus. In another of its more specific aspects, it relates to a method of obtaining more nearly equal pebble-gas contact time through pebble heater and reaction chambers.

Thermal conversion processes which are carried out in so-called pebble heater apparatus utilize a flowing mass of solid heat exchange material, which mass is heated to a high temperature by passing hot gas therethrough in a first direct heat exchange step and is then caused to contact gaseous reactant materials, furnishing heat thereto in a second direct heat exchange. The conventional pebble heater apparatus generally comprises two chambers which may be disposed in substantially vertical alignment. The solid heat exchange material is introduced into the upper portion of the first or upper chamber. That material forms a moving bed of solid heat exchange material which flows downwardly through the chamber in direct heat exchange with hot gaseous heat exchange material. The solid heat exchange material is heated to a high temperature in the heat exchange and is then passed to a second chamber in which the hot solid heat exchange material is caused to contact gaseous reactant materials in a second direct heat exchange relation, furnishing heat for the treatment or conversion of the gaseous materials.

Conventional pebble heater chambers of pebble heater apparatus are generally formed as cylinders and a solid heat exchange material is passed thereinto in the form of a moving bed. Hot heat exchange gases are sometimes introduced into the upper cylindrical bed at the lower end and at the periphery of such chambers and are sometimes introduced through a perforate refractory arch which supports the moving pebble bed. The solid heat exchange material is drawn from a substantially central point in the bottom of the bed and is passed downwardly into a gas heating chamber where a second moving bed of solid heat exchange material is formed. One disadvantage of conventional pebble chambers in which a relatively shallow pebble bed is maintained and which has a single pebble outlet in its lower end is that it is most difficult to establish uniform flow of uniformly heated solid heat exchange material through the pebble chambers. In a chamber in which the withdrawal of solid heat exchange material is made from a substantially central point in the bottom of the pebble chamber, the center of the pebble bed tends to drop out at all levels in the pebble bed below a dimension in the neighborhood of less than one and one-half times the diameter of the cylinder served by the single pebble outlet. Another disadvantage of the conventional pebble heater apparatus is that gas which is injected into the pebble chamber does not have a uniform contact time through the entire length of the pebble bed.

Solid heat exchange material which is conventionally used in pebble heater apparatus is generally called "pebbles." The term "pebbles" as used herein denotes any solid refractory material of flowable size and form, having strength which is suitable to carry large amounts of heat from the pebble heating chamber to the gas heating chamber without rapid deterioration or substantial breaking. Pebbles conventionally used in pebble heater apparatus are substantially spherical and range from about one-eighth inch to about one inch in diameter. In a high temperature process, pebbles having a diameter between one-fourth and three-eighths inch are preferred. The pebbles must be formed of a refractory material which will withstand temperatures at least as high as the highest temperatures attained in the pebble heating chamber. The pebbles must also be capable of withstanding temperature changes within the apparatus. Refractory materials, such as metal alloys, ceramics, or other material having the properties above described may be utilized to form such pebbles. Silicon carbide, alumina, periclase, beryllia, stellite, zirconia, and mullite may be satisfactorily used to form such pebbles or may be used in admixture with each other or with other materials. Pebbles formed of such materials, when properly fired, serve very well in high temperatures, some withstanding temperatures up to about 3500° F. Pebbles which are used may be either inert or catalytic when used in any selected process.

An object of the invention is to provide improved means for thermally treating or reacting gaseous materials. Another object is to provide an improved means for controlling pebble flow through pebble heater apparatus. Another object is to provide an improved method of controlling pebble flow through pebble heater apparatus. Another object is to provide means to better equalize the residence time of gases passing through the pebble chamber. Another object is to provide an improved method for equalizing the residence time of gases passing through chambers of pebble heater apparatus. Other and further objects and advantages will be apparent upon study of the accompanying discussion and the drawings.

Figure 3:
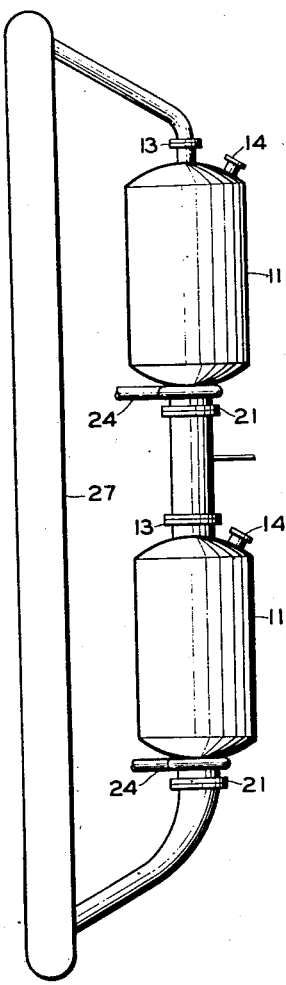
Figure 2:
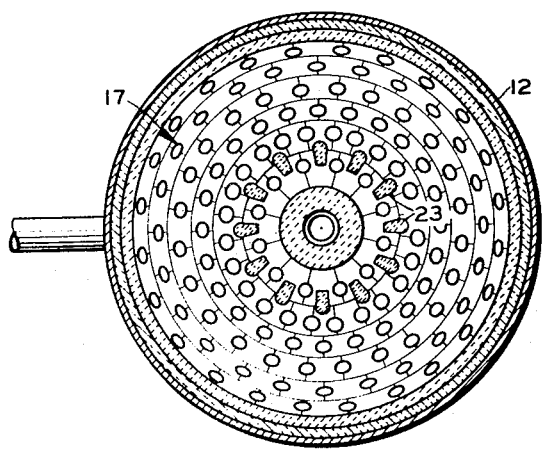
Figure 5:
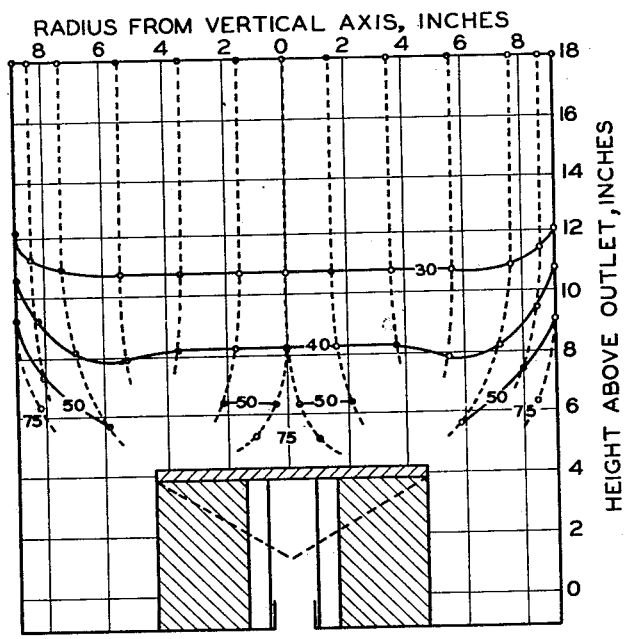
Figure 4:
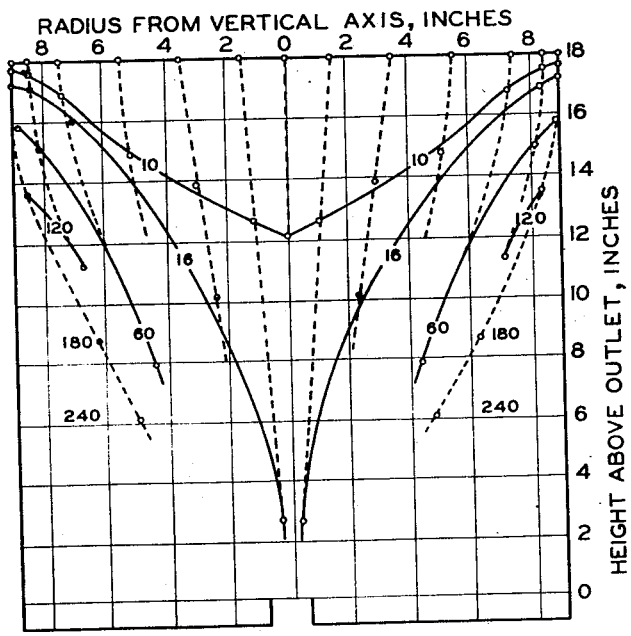
Figure 1:
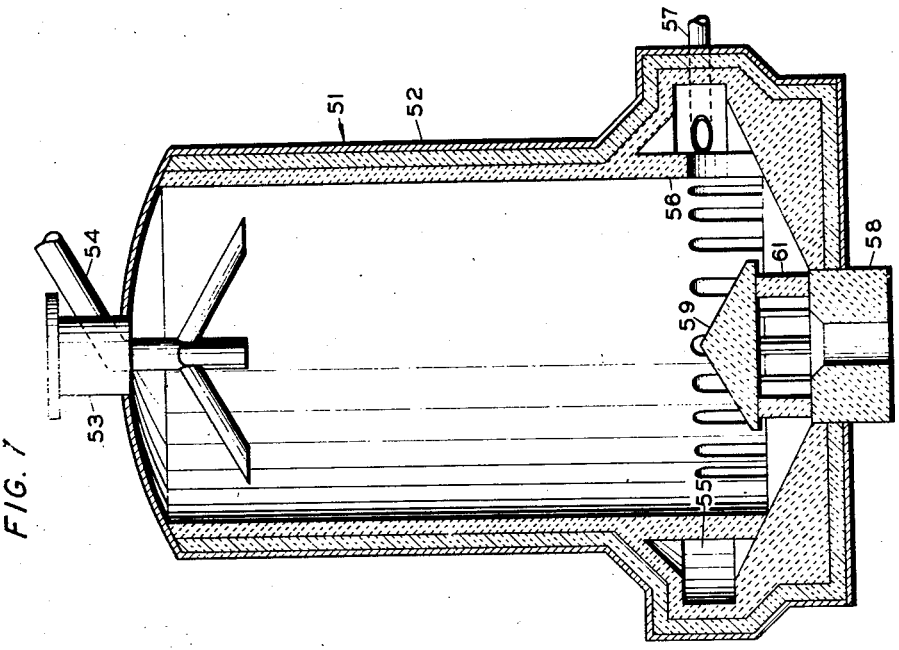
Figure 6:
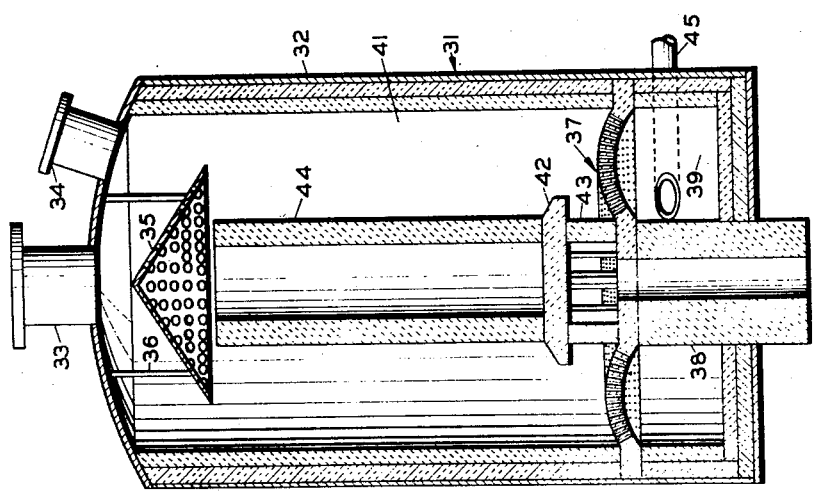

Understanding of the invention will be facilitated upon reference to the diagrammatic drawings, in which Figure 1 is a vertical section of a pebble chamber embodying the invention. Figure 2 is a horizontal cross-section of the device shown in Figure 1 taken at line 2—2. Figure 3 is a schematic view of a pebble heater apparatus. Figure 4 is a graph showing pebble flow patterns in a pebble chamber which is not provided with the baffle arrangement of this invention. Figure 5 is a graph showing pebble flow patterns in a pebble chamber equipped with the pebble baffle arrangement of this invention. Figure 6 is a vertical section of a pebble chamber embodying a modification of the invention. Figure 7 is a vertical section of a pebble chamber embodying another modification of the invention.

In Figure 1 of the drawings, pebble chamber 11 comprises a substantially vertically disposed closed outer shell 12. The walls of shell 12 are lined with insulating means which may include common refractory material and super-refractory material as well as other insulation material. The exact materials utilized in the formation of the insulation lining for shell 12 will depend upon the temperatures to be experienced within the shell. When the pebble chamber is to be utilized as a pebble heating chamber, super-refractory materials backed by other insulation materials are preferred because high temperatures, i. e., ranging as high as from 3000 to 3300° F. are experienced therein. When the chamber is utilized as the gas heating chamber of pebble heating apparatus, insulation materials having somewhat lower heat resistance may be utilized. Common refractory materials which may be utilized may include block insulation, insulating fire brick, and fire clay fire brick. Super-refractory materials may include silicon carbide, mullite, alumina, or other suitable refractory materials having physical and chemical properties which provide sufficient strength to withstand reasonably heavy external pressure and high temperature without substantial breakage or deterioration.

Shell 12 is provided with a pebble inlet 13 which is substantially centrally disposed in the upper end of said shell. Effluent outlet conduit 14 is also disposed in the upper end of shell 12. Perforate baffle member 15 is disposed within the upper portion of the chamber formed within shell 12 and is in substantially coaxial alignment with pebble inlet 13. Baffle member 15 is axially provided with a pebble conduit 16 which extends from the apex of said baffle to a point preferably as low as the lower edge of said baffle 15. Perforations are spaced over the area of baffle member 15 so as to allow the passage of gas without the passage of pebbles therethrough. Load supporting dome 17 is provided within shell 12 at a point intermediate the ends of said shell. Dome 17 is convex and is so constructed as to have sufficient strength to support the mass of pebbles flowing through the chamber. The materials used in the construction of dome 17 may be varied depending upon whether the chamber is used as a pebble heater chamber or a gas heating chamber. In pebble heater chambers, the convex dome is preferably constructed of super-refractory bricks 18 which are connected together to form self-supporting rings, which self-supporting rings also give support to one another to form load supporting dome 17. Bricks which are suitable for construction of dome 17 are constructed in the form of plugs which taper inwardly on all four lateral sides from top to bottom. Two of the lateral sides are grooved so that when the bricks are fitted together with adjacent bricks the grooves form communication means or perforations which extend from the space below to the space above said dome. The other two lateral sides are curved from side to side, one side being convex and the other concave. Pebble outlet conduit means preferably comprises pebble outlet throat 19 which is tapered so as to be supported by load supporting dome 17 and pebble outlet conduit 21 which extends upwardly through the bottom of shell 12 into operative communication with pebble outlet throat 19.

Baffle member 22 is preferably imperforate and is substantially coaxially disposed with and spaced above pebble outlet throat 19. The baffle may be in the form of a cone or a plate, preferably having a circular cross-section. It is preferred, however, that the apex angle of the cone be greater than 90°. Baffle member 22 is supported on load supporting dome 17 by support members 23. Baffle member 22 may be formed with a perforate depending lip which will be equivalent to members 23 and will support the baffle and allow passage of pebbles through the perforations. The baffle may also be formed in sections which when fitted together preferably form a circular baffle. Support members 23 are preferably of such length that baffle member 22 is supported above the angle of repose taken at the inlet of pebble outlet throat 19. The angle of repose may vary from 30 to 45° from the horizontal depending upon the height of the pebble bed, the size, the shape and the composition of the pebbles within chamber 11. Gaseous material inlet means 24 is provided to inject gaseous material into the gas distribution chamber 25 beneath dome 17. Inlet means 24 may be in the shape of a header member having a plurality of inlet conduits extending vertically or laterally into chamber 25. When chamber 11 is utilized as a pebble heating chamber, the gaseous inlet conduits will contain burner means for the purpose of burning the gaseous material in chamber 25 so as to provide hot combustion gas for the purpose of heating pebbles within pebble containing chamber 26 above dome 17.

In the operation of the device shown in Figure 1 and Figure 3 of the drawing, pebbles are injected through pebble inlet 13 of upper chamber 11 and flow downwardly over baffle 15 and through pebble conduit member 16. A contiguous flowing bed of pebbles is formed within chamber 26. A substantially conical shaped cavity is formed within the upper portion of the pebble bed by the flow of pebbles through conduit 16 and over baffle member 15. The pebbles flow downwardly through chamber 26 and the flow of pebbles in the central portion of the chamber is substantially obstructed by baffle member 22. The pebbles flow inwardly through or between support members 23 and downwardly through pebble outlet throat 19 and pebble outlet conduit 21 to the lower chamber 11 where the pebble flow is repeated. Pebbles are removed through pebble outlet 21 in the bottom of the lower chamber 11 and are elevated to the upper portion of the upper chamber 11 by means of elevator 27. Combustion material is injected through combustion material inlet means 24 in the upper chamber 11 into chamber 25 in which the material is burned so as to form hot combustion gases which flow upwardly through perforate dome 17 and upwardly through the flowing bed of pebbles in chamber 26.

Pebbles flowing through pebble inlet conduit 13 normally tend to form a pebble bed having a conical top. The distance which gaseous materials would normally have to travel through the central portion of the bed would therefore be considerably greater than the materials traveling along the periphery of the pebble bed. By the instant invention, a central upper portion of the bed is replaced by a cavity caused by the baffling of pebbles by baffle member 15. Gases flowing through the central portion of the pebble bed take a short-cut by passing upwardly through the cavity and through baffle member 15 and out of the pebble bed and through effluent outlet conduit 14. In this manner the residence time of gaseous material passing through the center of the pebble bed is made substantially equal to that of the gases passing up the periphery of the bed.

Chamber 11 may be modified by placing a baffle over perforate dome 17 in such manner that gaseous materials flowing upwardly through the perforations of the dome are directed inwardly and upwardly toward the axis of the pebble bed within the chamber 11. An opening may be provided, in the central portion of the baffle, of sufficient size to allow the desired gas volume to flow upwardly therethrough into chamber 26. All of the gas is thus directed in countercurrent flow with the pebbles flowing inwardly and downwardly toward the pebble outlet. Aggregate material may be provided within chamber 26 instead of a gas baffle so as to cover dome 17 and separate the pebble bed from the dome.

In Figure 6, pebble heater chamber unit 31 comprises a substantially vertically disposed closed outer shell 32. The walls of shell 32 are lined with insulating means similar to that described in the description of Figure 1. The materials utilized in the formation of the insulation lining of shell 32 are also similar to those used in the structure of Figure 1. Shell 32 is provided with a pebble inlet 33 substantially centrally disposed in the upper end of the shell. Effluent outlet conduit 34 is also disposed in the upper end portion of shell 32. Perforate baffle member 35 is disposed within the upper portion of the chamber formed within shell 32 and is disposed in substantially coaxial alignment with pebble inlet 33. Baffle member 35 is preferably held in place by support members 36 extending from the top of the closure member of shell 32. Annular load supporting arch 37 is disposed within shell 32 at a point intermediate the ends of the shell. Arch 37 may be constructed of plug shaped bricks similarly to dome 17 described in connection with Figure 1 of the drawing. The inner circumference of arch 37 may be supported by the upper end of pebble outlet conduit 38 which extends upwardly through the bottom closure member of shell 32. Arch 37, when disposed as described, divides the chamber within shell 32 into a combustion or gas distribution chamber 39 below the arch and pebble chamber 41 above the arch. Baffle member 42 is preferably imperforate and is supported on arch 37 or pebble outlet 38 by means of supports 43 which are similar to supports 32 described in connection with Figures 1 and 2 of the drawing. Core 44 is disposed above baffle member 42 so as to prevent the flow of pebbles through the central portion of the chamber formed within shell 32. Core 44 may be annular as shown in the drawing or may be solid. It is believed, however, that the annular core will be preferred by reason of the saving in weight and in efficiency of heat transfer. Gas inlet conduit means 45 are disposed in the lower portion of shell 32 so as to provide inlet for gaseous materials into combustion or gas distribution chamber 39. Tangential positioning of the gas inlets is preferred but the inlets may be directed into chamber 39 in any desired direction.

The operation of the modified pebble chamber of Figure 6 is somewhat similar to that of Figure 1 described above. Pebbles are injected through pebble inlet 33 into pebble chamber 41. The pebbles so injected flow downwardly and outwardly over the surface of perforate baffle 35 and form a compact, contiguous, flowing mass as they move downwardly through the chamber. If pebble chamber unit 31 is utilized as a pebble heating chamber, fuel gas is injected through inlet conduit 45 into chamber 39 where the fuel gas is burned and distributed, and resulting combustion gas flows upwardly through the pebble supporting perforate arch 37 and the pebble mass within chamber 41. Effluent materials are removed from the upper portion of chamber 41 through effluent outlet conduit 34. If pebble chamber 31 is utilized as a gas conversion or treating chamber, the gaseous material to be treated or converted is injected through inlet conduit 45 into chamber 39 in which substantially even distribution is made so as to allow an even flow of gas upwardly through perforate arch 37 and the pebble bed within chamber 41. Pebbles flowing downwardly through pebble chamber 41 flow inwardly between supports 43 and downwardly through pebble outlet conduit 38.

In the device shown in Figure 7 of the drawing, chamber unit 51 comprises shell 52 which is insulated similarly to the chambers shown in Figure 1 and Figure 6 of the drawing. Effluent outlet conduit 53 is disposed substantially centrally in the upper end closure of shell 52. Pebble inlet conduit 54 extends into and through effluent outlet conduit 53 and into the upper portion of the chamber formed within shell 52. The lower end of conduit 54 is branched so as to form a plurality of pebble outlets spaced about said chamber intermediate its axis and periphery. A combustion or gas distribution chamber 55 is formed adjacent the lower portion of the chamber within shell 52 by perforate refractory wall 56. Gaseous inlet conduit means 57 are provided so as to extend into chamber 55. Pebble outlet conduit 58 is provided in the bottom closure of shell 52. Pebble baffle 59 is preferably imperforate and is provided above the pebble opening in pebble outlet conduit 58 and is supported thereabove by support members 61 which are similar to support members 23 and 43 of Figures 1 and 6 respectively.

The operation of the device shown in Figure 7 of the drawing is similar to that of the devices shown in Figures 1 and 6 of the drawings. Pebbles are introduced into the chamber within shell 52 through pebble inlet conduit 54. The pebble bed formed thereby is compact and contiguous as it moves downwardly through the pebble chamber and between supports 61 and out of the chamber through pebble outlet conduit 58. Gaseous material is introduced through inlet conduits 57 into chamber 55 in which chamber the gas is burned and/or distributed, depending on the use to which the particular chamber is being put, i. e., whether it is being utilized as a pebble heating chamber or as a gas conversion or treating chamber. The gaseous materials flow into the pebble bed through the perforations in wall 56 and upwardly through the contiguous flowing mass of pebbles and are removed from the chamber through effluent outlet conduit 53. It is conceived that many modifications of this invention may be made in view of the disclosure. Baffle 15, together with pebble inlet conduit 13 and effluent outlet conduit 14 shown in Figure 1, may be used to replace effluent outlet conduit 53 and pebble inlet conduit 54 in the device shown in Figure 7. In a like manner, core 44 may be utilized to form an annular pebble bed within chamber 51 shown in Figure 7. The combustion or gas distribution chamber may be so placed about the periphery of the pebble chamber that gases will be introduced into only that portion of the bed through which the cross-section of flowing pebble bed is substantialy uniform. The combustion or gas distribution chamber may be spaced from the lower end of the pebble chamber a sufficient distance so as to be adjacent the uniformly flowing portion of the pebble bed. With such positioning of the combustion chamber the pressure drop in the pebble chamber will be maintained at a minimum while allowing even gas distribution. It is also contemplated that the combustion or gas distribution chamber 39 shown in Figure 6 may be built into chamber 51 so as to replace the outer periphery of combustion or gas distribution chamber 55 shown in Figure 7.

The diameter of the baffle member which is disposed over the pebble outlet in Figures 1, 6, and 7 of the drawings is preferably between about one-fourth and five-eighths of the diameter of the pebble chamber. The baffle members which are designated by numerals 22, 42, and 59 respectively are positioned so that the outer periphery of the baffle is not closer than eight pebble diameters to the angle of pebble repose taken at the pebble outlet and not above the angle of pebble slip taken at the same point. The angle of repose varies between about 30° and 45° depending on the size and roundness of the pebbles. The angle of slip varies between 60° and 75° depending upon the same variables and the depth of the pebble bed.

Specific advantages to be derived by the utilization of the instant invention will be even more obvious upon reference to and comparison of the graphs shown as Figures 4 and 5 of the drawings. A model pebble chamber having a diameter of 18 inches and a 1¼ inch pebble outlet centrally located in its bottom end is filled with pebbles to a depth of 18 inches. Colored pebbles are distributed over the top surface of the pebble bed as indicated in the graph. Given volumes of pebbles are removed through the pebble outlet in the bottom of the chamber while equal amounts of pebbles are added to the top of the chamber. After a given volume of the pebbles are removed from the pebble chamber, the added pebbles are removed so as to determine the position of the colored pebbles within the pebble bed. The graph shown as Figure 4 shows the initial position of the colored pebbles before withdrawal and after the withdrawal of 10, 16, 60 and 120 liters of pebbles from the unit which has a total volume of 75 liters. It will be seen that the center of the pebble bed drops out immediately upon the withdrawal of pebbles and considerable amounts of the original pebbles remain after nearly twice the total volume of the unit has been withdrawn. Broken arrow lines indicate the direction of flow of the colored pebbles and isochores are used to connect the positions plotted for the colored pebbles after each withdrawal step.

Figure 5 is a graph showing the flow of colored pebbles through a pebble chamber similar to that described with regard to Figure 4. A plate baffle is supported on a plurality of pillar supports similar to those shown as supports 23 of Figure 2 of the drawing. The chamber is filled to a depth of 18 inches and colored pebbles are located in the upper layer of the pebble bed similarly to those shown as being positioned in Figure 4 of the drawing. Given volumes of pebbles are withdrawn through the 1¼ inch outlet in the bottom of the pebble chamber while equal amounts of pebbles are added to the top of the pebble bed. The positions of the colored pebbles are determined after the withdrawal of 30, 40 and 50 liters of pebbles from the chamber, which has a total volume of 75 liters, as will be seen in the graph shown as Figure 5 of the drawing. A substantially uniform rate of flow is maintained across the pebble bed during the withdrawal of 30 liters of pebbles and with very little drop-out in the side portions of the pebble bed after an additional 10 liters of pebbles has been withdrawn. Study and comparison of the two graphs will disclose that far greater uniformity of pebble flow is obtained in a pebble chamber in which the disc-baffle is utilized than in the chamber in which no baffle is provided.

As will be evident to those skilled in the art, various modifications of this invention can be made or followed in the light of the foregoing disclosure, discussion, and examples without departing from the spirit or scope of the disclosure.

I claim:

1. In pebble heater apparatus utilizing a moving bed of heated pebbles, an improved pebble chamber comprising a substantially vertically disposed closed outer shell; pebble inlet means centrally disposed in the upper end of said shell; a gas distribution chamber adjacent the lower portion of the pebble chamber within said shell; gaseous material inlet means communicating between a gaseous material supply source and said gas distribution chamber; pebble outlet conduit means centrally disposed in the lower end of said shell and communicating between said pebble chamber and the exterior of said shell; an imperforate pebble baffle having a diameter between ¼ and ⅝ that of the chamber, said baffle being disposed within the lower portion of said chamber so that its periphery is inside and separated by at least eight pebble diameters from an inverted cone having its vertex at the central pebble outlet and formed by the angle of pebble repose, and so that its periphery is outside of an inverted cone, formed by the pebble angle of slip and having the same point of vertex, said baffle being the sole pebble baffle in the lower portion of said pebble chamber; and effluent outlet means in the upper portion of said shell.

2. The pebble chamber of claim 1, wherein a perforate pebble support separates said gas distribution chamber from said pebble chamber; and a perforate pebble baffle disposed substantially co-axially with said pebble inlet and in the upper portion of said pebble chamber, said perforations in said pebble support and said baffle being sized so as to prevent the passage of pebbles therethrough.

3. The pebble chamber of claim 2, wherein a core extends upwardly from said imperforate baffle into the upper portion of said pebble chamber.

4. The pebble chamber of claim 1, wherein said gas distribution chamber is disposed adjacent the periphery of the lower portion of said pebble chamber, communication being provided therebetween by perforations in a separating wall; and said pebble inlet means having a plurality of outlets spaced about said chamber intermediate its axis and periphery.

5. In pebble heater apparatus utilizing a moving bed of heated pebbles, an improved pebble chamber comprising a substantially vertically disposed closed outer shell; liner means within and adapted so as to insulate said shell; pebble inlet means centrally disposed in the upper end of said shell; a perforate baffle coaxially disposed with and spaced below said pebble inlet, said perforate baffle being provided with a pebble conduit centrally disposed and extending therethrough and said perforations being disposed so as to prevent the flow of pebbles therethrough; a perforate load supporting dome within said chamber, intermediate the ends of said pebble chamber and dividing said pebble chamber into a heat exchange zone above said dome and a gas distribution zone below said dome; pebble outlet conduit means extending substantially centrally through said dome and downwardly through said gas distribution zone; a pebble baffle coaxially disposed with and spaced above said pebble outlet conduit means a sufficient distance to be above the angle of pebble repose taken at said pebble outlet; and gaseous material inlet means extending through the wall of said shell into said gas distribution zone.

6. In pebble heater apparatus utilizing a moving bed of heated pebbles, an improved pebble chamber comprising a substantially vertically disposed closed outer shell; pebble inlet means centrally disposed in the upper end of said shell; a perforate baffle coaxially disposed with and spaced below said pebble inlet in the upper portion of said chamber, said perforations being adapted so as to prevent the flow of pebbles therethrough; a pebble conduit extending substantially coaxially with and a spaced distance through said perforate baffle; a perforate load supporting dome within said chamber intermediate the ends of said pebble chamber and dividing said pebble chamber into a heat exchange zone above said dome and a gas distribution zone below said dome; pebble outlet conduit means extending substantially centrally through said dome and downwardly through said gas distribution zone; a circular pebble baffle coaxially disposed with and spaced above said pebble outlet conduit means a sufficient distance to be above the angle of pebble repose taken at said pebble outlet; and gaseous material inlet means extending through the wall of said shell into said gas distribution zone.

7. The pebble chamber of claim 6, wherein the upper surface of said circular baffle is conical in shape, having an apex angle greater than 90°.

8. The pebble chamber of claim 6, wherein said circular baffle is supported by a perforate annular support, said perforations in said support having a cross-sectional area of at least seven pebble diameters and being substantially equal in size.

9. In pebble heater apparatus utilizing a moving bed of pebbles, an improved method for effecting heat exchange between gaseous materials and pebble material which comprises the steps of introducing hot pebbles into the upper portion of a heat exchange zone so as to form a contiguous flowing pebble bed in said heat exchange zone; baffling said pebbles in the inlet portion of said heat exchange zone so as to produce a central cavity within the upper portion of said pebble bed; passing said pebble bed directly downwardly through said heating zone; baffling said pebbles adjacent the outlet portion of said heat exchange zone so as to materially retard the flow of pebbles through the central portion of said heat exchange zone; injecting gaseous material into a gas distribution zone below said heat exchange zone; passing said gaseous material upwardly through a separation zone and upwardly through said heat exchange zone, whereby contact time of said gaseous material with said pebbles is substantially equalized by reason of centrally flowing gases passing through said central cavity; removing effluent material from the upper portion of said heat exchange zone; and removing a contiguous stream of pebbles from the lower portion of said heat exchange zone.

10. The pebble chamber of claim 1, wherein a perforate pebble support separates said gas distribution chamber from said pebble chamber; and a perforate pebble baffle, having a pebble conduit axially disposed therethrough, disposed substantially co-axially with said pebble inlet and in the upper portion of said pebble chamber, said perforations in said pebble support and said baffle being sized so as to prevent passage of pebbles therethrough.

ROBERT R. GOINS.

REFERENCES CITED

The following references are of record in the file of this patent:

UNITED STATES PATENTS

| Number | Name | Date |
| --- | --- | --- |
| 1,679,099 | Smith | July 31, 1928 |
| 2,227,634 | Dalin | Jan. 7, 1941 |
| 2,417,393 | Evans | Mar. 11, 1947 |

FOREIGN PATENTS

| Number | Country | Date |
| --- | --- | --- |
| 501,765 | Great Britain | Mar. 6, 1939 |